US 6,688,374 B2

(12) United States Patent
Dondlinger

(10) Patent No.: US 6,688,374 B2
(45) Date of Patent: Feb. 10, 2004

(54) BARRIER WITH MOVABLE CURTAIN

(75) Inventor: Jason T. Dondlinger, Bellevue, IA (US)

(73) Assignee: Rite-Hite Holding Corporation, Milwaukee, WI (US)

(*) Notice: Subject to any disclaimer, the term of this patent is extended or adjusted under 35 U.S.C. 154(b) by 0 days.

(21) Appl. No.: 09/991,299

(22) Filed: Nov. 9, 2001

(65) Prior Publication Data

US 2003/0089461 A1 May 15, 2003

(51) Int. Cl.[7] ................................................ A47H 5/00
(52) U.S. Cl. ........................ 160/340; 160/118; 160/265
(58) Field of Search ........................... 160/102, 118, 160/243, 264, 265, 270, 271, 84.01, 268.1, 310, 340

(56) References Cited

U.S. PATENT DOCUMENTS

| | | | | | |
|---|---|---|---|---|---|
| 574,552 | A | * | 1/1897 | Lytton | 160/265 |
| 4,707,938 | A | * | 11/1987 | Carssow | 40/471 |
| 5,222,541 | A | * | 6/1993 | Hornberger | 160/265 |
| 5,280,818 | A | * | 1/1994 | Ubelhart | 160/265 |
| 5,515,898 | A | * | 5/1996 | Alcocer | 160/84.02 |
| 5,620,039 | A | * | 4/1997 | Delgado et al. | 160/265 |
| 5,632,317 | A | * | 5/1997 | Krupke et al. | 160/265 |
| 5,655,591 | A | * | 8/1997 | Knutson | 160/265 |
| 5,752,557 | A | * | 5/1998 | Crider et al. | 160/121.1 |
| 5,758,705 | A | * | 6/1998 | Wagner et al. | 160/310 |
| 5,819,835 | A | | 10/1998 | Broome | 160/243 |
| 5,915,448 | A | * | 6/1999 | Schulte | 160/271 |
| 6,079,472 | A | * | 6/2000 | Schanz | 160/265 |
| 6,082,433 | A | * | 7/2000 | Vafaie et al. | 160/310 |
| 6,095,231 | A | * | 8/2000 | Hahn | 160/370.22 |
| 6,145,568 | A | * | 11/2000 | Lundstrom | 160/84.02 |
| 6,152,207 | A | * | 11/2000 | Varley | 160/264 |
| 6,155,326 | A | * | 12/2000 | Imhoff et al. | 160/243 |
| 6,192,960 | B1 | * | 2/2001 | Simon | 160/84.06 |
| 6,394,172 | B1 | * | 5/2002 | Kessous | 160/264 |
| 6,439,292 | B1 | * | 8/2002 | Schutte et al. | 160/265 |

FOREIGN PATENT DOCUMENTS

| DE | WO 93/13289 | * | 7/1993 | 160/265 |
|---|---|---|---|---|
| EP | 1013870 | * | 12/1999 | 160/265 |

* cited by examiner

*Primary Examiner*—Bruce A. Lev
(74) *Attorney, Agent, or Firm*—Marshall, Gerstein & Borun LLP

(57) ABSTRACT

A barrier includes a curtain vertically movable between a closed and open position. The curtain is interposed between right and left vertical tracks, which guide the curtain's movement. A drive unit raises and lowers a right edge of the curtain, while a clever strap system supports the curtain's left edge. The strap system includes a strap having one end fixed to an upper end of the left track and an opposite end fixed to a lower end of the right track. The strap runs across a leading edge of the curtain while passing across a left side roller and a right side roller mounted to opposite ends of the curtain's leading edge. The strap runs underneath the left roller to support the left side of the curtain. The strap runs across the top of the right roller to keep the strap from simply dropping out from underneath the left roller.

33 Claims, 10 Drawing Sheets

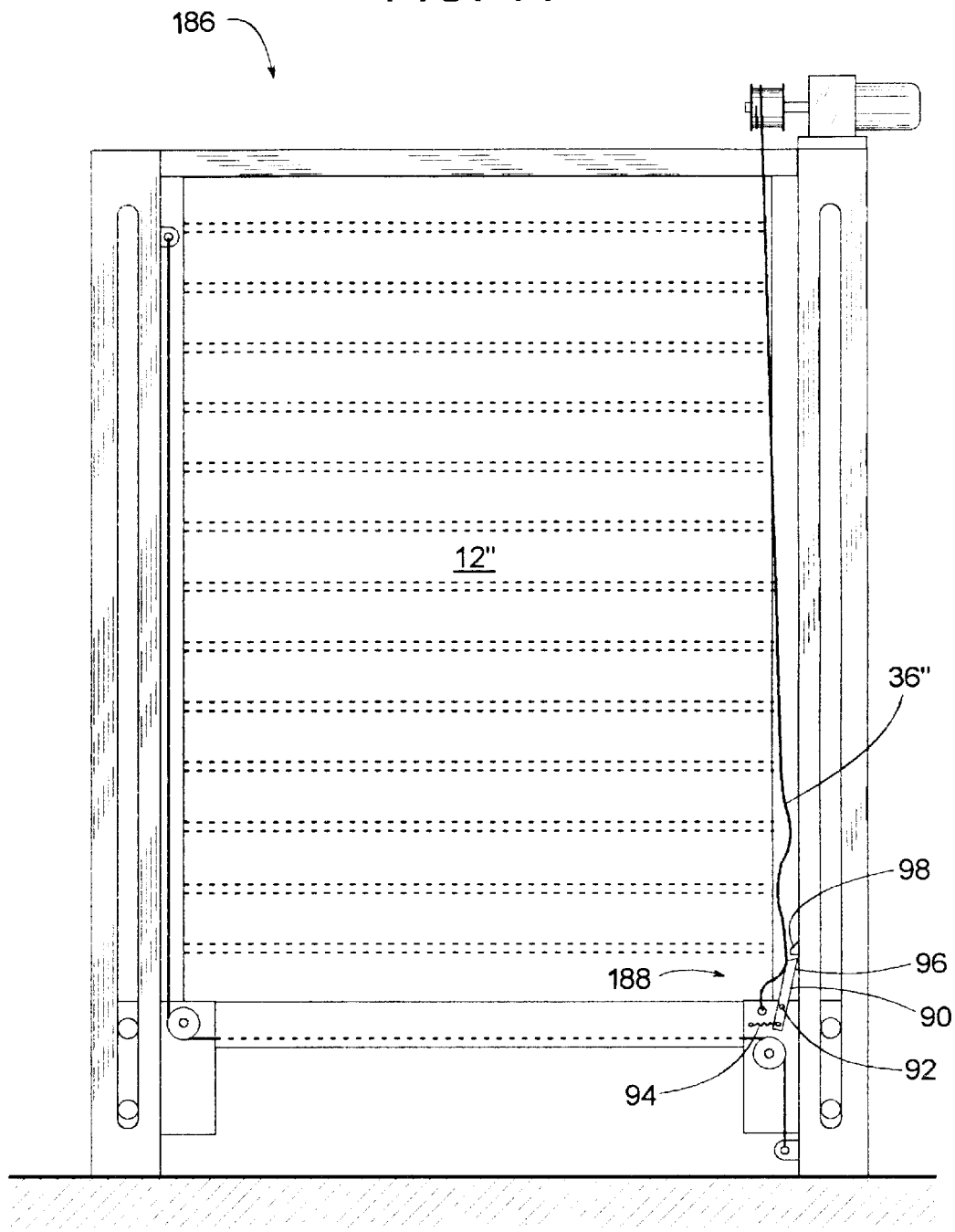

BARRIER WITH MOVABLE CURTAIN

BACKGROUND OF THE INVENTION

1. Field of the Invention

The subject invention generally pertains to a movable barrier and more specifically to a barrier adapted for various uses including, but not limited to, use as a door, machine guarding, and welding flash shield.

2. Description of Related Art

At some work centers, various barriers are often used for protecting nearby personnel from the hazards of moving or otherwise hazardous machinery and materials. Examples of such hazards may include, but are not limited to, large or fast moving parts traveling along a conveyor, machining centers throwing chips or coolant, welders emitting eye-damaging light, power washers spraying water, presses, punches, and brakes. If periodic access to such work centers is needed, the protective barrier may be designed with a feature that allows the barrier to be readily moved. For example, the barrier may include a panel that swings or otherwise moves between an open and closed position.

However, moving a panel to its open position may place the panel in a location that interferes or creates problems with other operations associated with the work center. If the panel swings open and closed, dedicated floor space may be needed just for the door's operation. This can be a serious problem in situations where space is limited. Having a vertically moving panel that rises to its open position may solve the problem of limited floor space. However, if the panel rises to its open position, the raised panel may interfere with loading or unloading parts to and from the work center. In some cases, reaching underneath a raised panel may be awkward. Also, there may be insufficient headroom to lift a part up and over the raised panel. If the part is heavy and lifted with a jib hoist, a large heavy load swinging high overhead creates a hazard in itself.

In many applications, a preferred design would be a panel that opens by descending to a lowered position. Unfortunately, such a panel may be difficult to raise and lower without a drive mechanism operating on both lateral edges of the panel. Such a drive mechanism, if it even exists, may be costly and/or may involve installing an overhead drive shaft. Such a shaft may create some of the same problems associated with a panel having a raised open position.

SUMMARY OF THE INVENTION

In some embodiments, a barrier maintains a movable curtain in a proper orientation by coupling the curtain to two curtain guide members against which a pliable elongate member applies both an upward force and a downward force.

In some embodiments, the tension in a pliable elongate member horizontally compresses a curtain header.

In some embodiments, a pliable elongate member that helps support the weight of a curtain passes through a curtain header of the curtain.

In some embodiments, two pliable elongate members share the load of supporting a curtain's weight substantially equally, yet the tension in one of the pliable elongate members is appreciably greater than that in the other.

In some embodiments, a barrier includes a curtain that moves upward from a closed position to an open position.

In some embodiments, a barrier includes a curtain that moves downward from a closed position to an open position.

In some embodiments, to help maintain a curtain in a proper orientation, a pliable elongate member extends above and below a leading edge of a curtain and transits from one side of the curtain to an opposite side.

In some embodiments, a barrier is at times inhibited from opening by coupling the barrier's curtain to two pliable elongate members, which are wrapped in opposite directions around a powered drum.

In some embodiments, a barrier is inhibited from opening upon losing tension in a pliable elongate member that was intended for supporting the weight of the barrier's curtain.

In some embodiments, a barrier includes a curtain holder that helps collect a lower, slack portion of the curtain as the curtain ascends to its open position.

BRIEF DESCRIPTION OF THE DRAWINGS

FIG. 11 is similar to FIG. 10, but showing the curtain-blocking device in a blocking position.

DESCRIPTION OF THE PREFERRED EMBODIMENT

Figure 1:
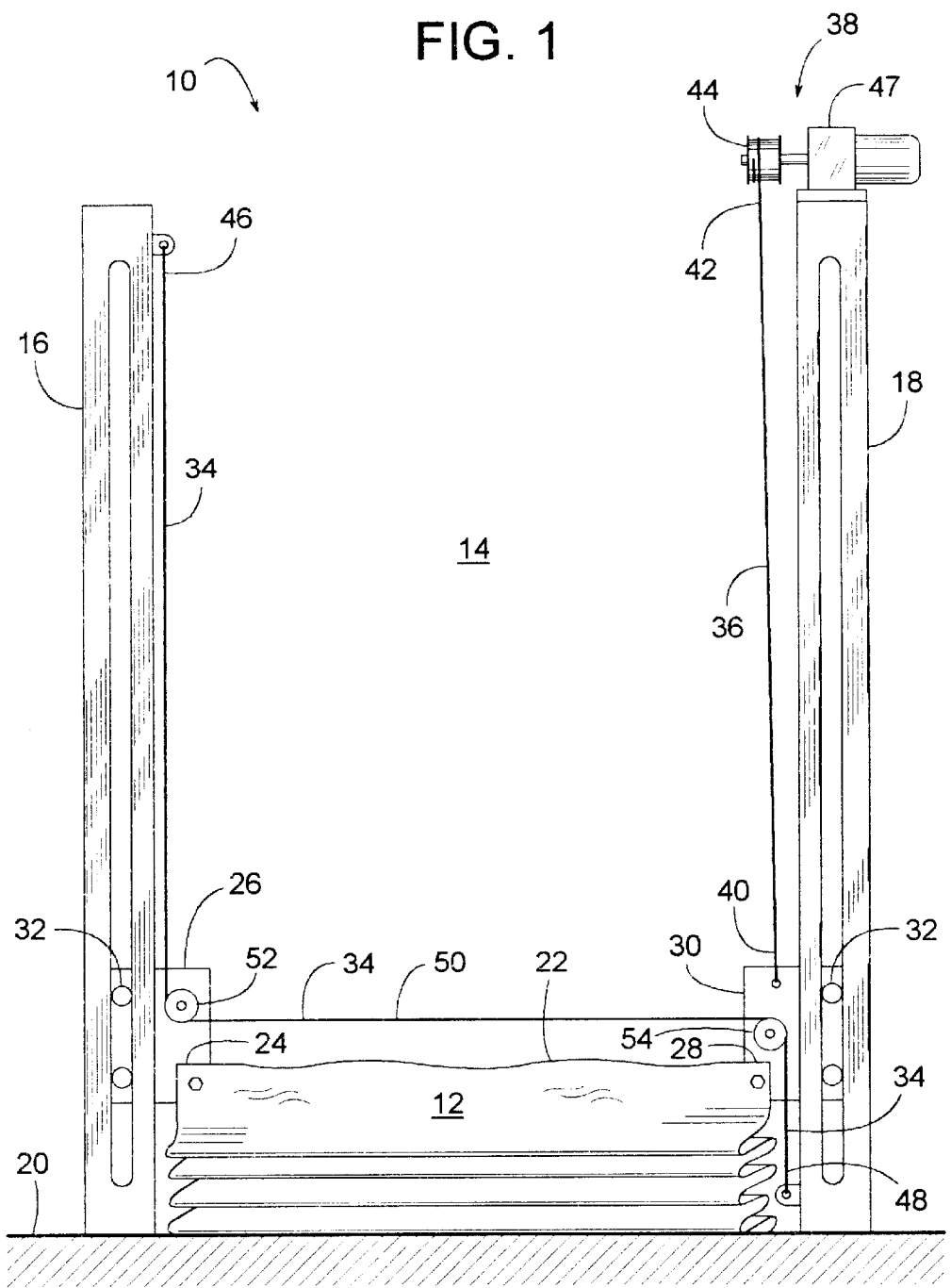
FIG. 1 is a schematic illustration of one embodiment of a barrier with its curtain lowered to an open position.
Figure 2:
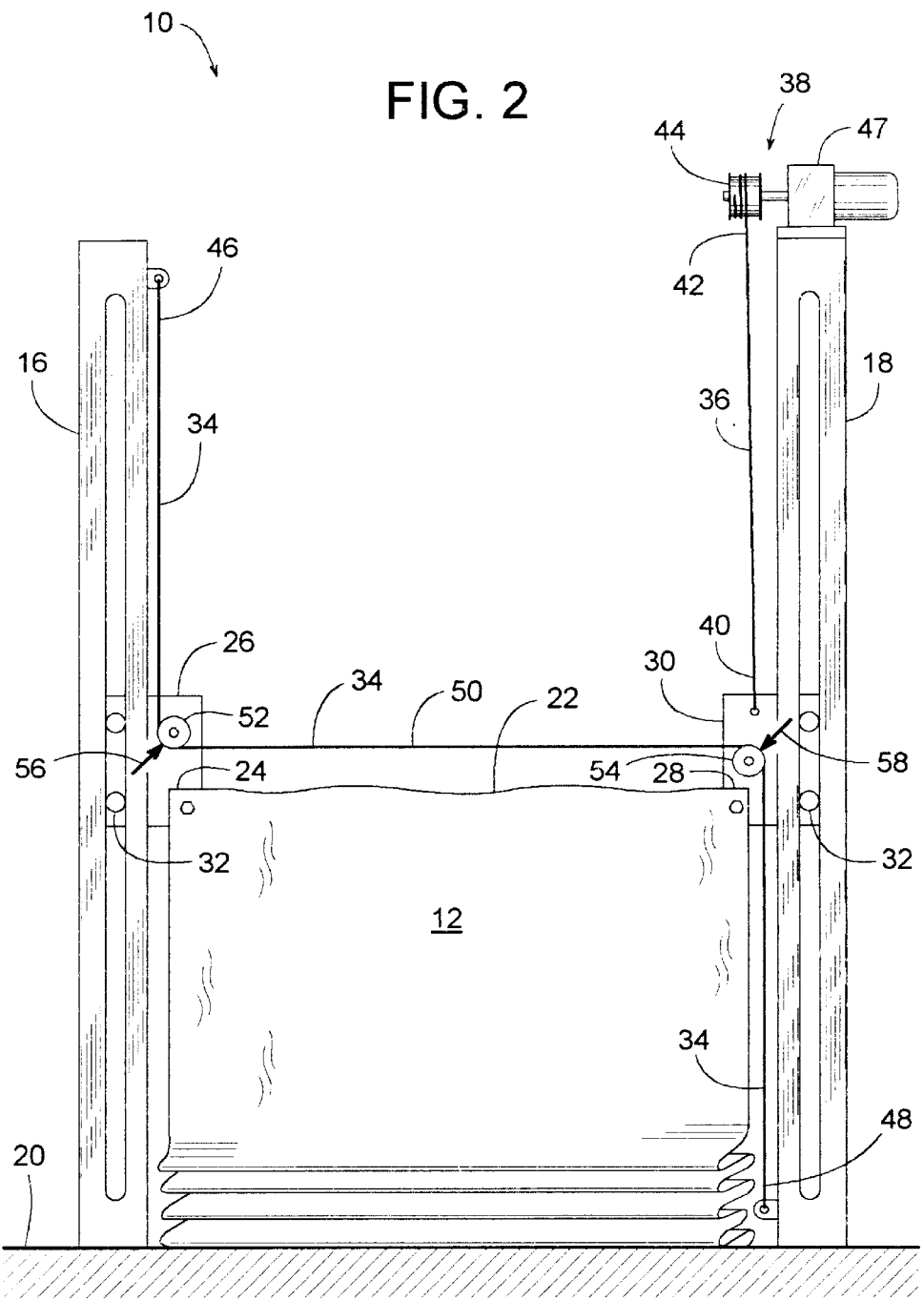
FIG. 2 is a schematic illustration of the barrier of FIG. 1, but shown with its curtain at an intermediate position.
Figure 3:
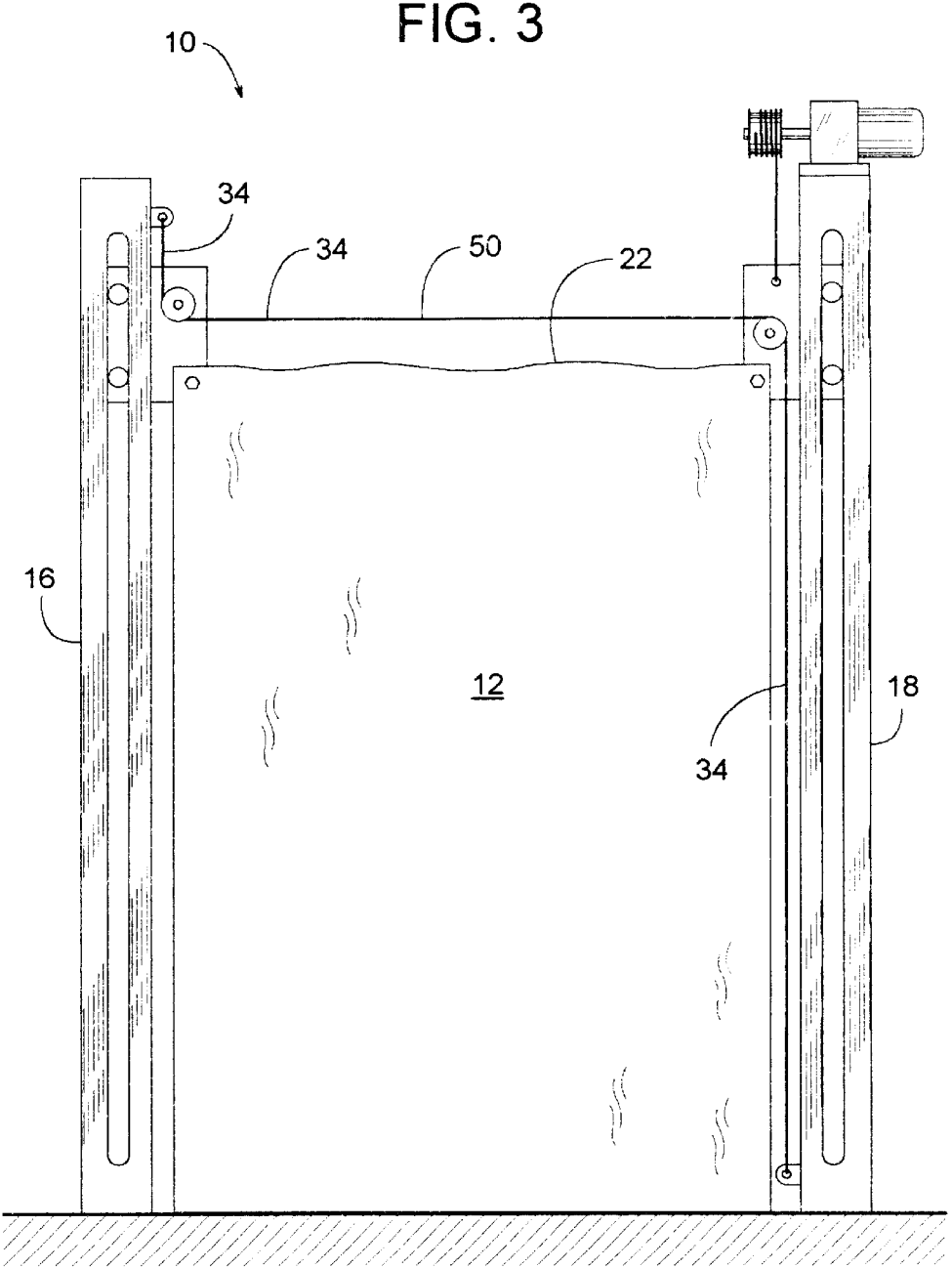
FIG. 3 is a schematic illustration of the barrier of FIG. 1, but shown with its curtain raised to a closed position.

A multipurpose barrier 10 includes a curtain 12 that is vertically moveable to an open position (FIG. 1), various intermediate positions (FIG. 2), and a closed position (FIG. 3). The term, "curtain" refers to any sheet that can readily bend and repeatedly recover its original shape. Examples of curtain 12 include, but are not limited to, a pliable sheet of plastic, a pliable sheet of fabric, and an assembly of pivotally interconnected rigid panels. The curtain's movement allows it to selectively cover and uncover an access opening 14 between two vertical tracks 16 and 18. Such an opening may simply be a doorway or may provide physical or visual access to an area that at times is preferably shielded or guarded. As curtain 12 opens, the lower portion of curtain 12 may fold upon itself or otherwise gather near floor level 20 where the lower portion of curtain 12 can be stored in some type of container or left exposed, as shown in FIG. 1.

To guide the curtain's movement, a leading edge 22 of curtain 12 includes a first end 24 attached to a first curtain guide member 26 and a second end 28 attached to a second curtain guide member 30, wherein guide members 26 and 30 are constrained to move vertically along tracks 16 and 18 respectively. The tracks and guide members are schematically illustrated to represent any apparatus having an element guided generally along a desired path. Guide members 26 and 30 may each be a trolley with rollers 32 or may be a sliding member that slides along an appropriately shaped track.

To support the weight of curtain 12, guide members 26 and 30 are suspended from a first pliable elongate member 34 and a second pliable elongate member 36, respectively. The pliable elongate members are schematically illustrated to represent all types of pliable elongate members including, but not limited to, a strap, cable, chain, rope, etc. A drive assembly 38 (e.g., a winch, lead screw and nut, pinion and gear rack, piston and cylinder, etc.) is used to raise and lower curtain 12. In a currently preferred embodiment, drive assembly 38 comprises the second elongate member 36, wherein elongate member 36 includes a lower end 40 fixed to guide member 30 and an upper end 42 wrapped around and fixed to a powered drum 44. A drive unit 47 (e.g., a motor) rotates drum 44 either clockwise or counterclockwise to selectively take-up or pay out second elongate member 36, which in turn raises and lowers second guide member 30 to raise and lower curtain 12.

To move first guide member 26 up and down in synchronization with the vertical movement of second guide member 30, and to maintain leading edge 22 of curtain 12 generally level, first elongate member 34 is installed in such a way as to avoid the need for an overhead cross member extending between the upper ends of tracks 16 and 18. More specifically, first elongate member 34 includes an upper portion 46 fixed relative to first track 16 and a lower portion 48 fixed relative to second track 18. An intermediate portion 50 of elongate member 34 runs generally alongside leading edge 22 of curtain 12 and extends between a first rotatable member 52 (e.g., a sheave, drum, wheel, etc.) on first guide member 26 and a second rotatable member 54 on second guide member 30. Thus, in this embodiment, elongate member 34 is coupled to curtain 12 via rotatable members 52 and 54 and via curtain guide members 26 and 30. First elongate member 34 passes underneath rotatable member 52 and over second rotatable member 54, such that the weight of curtain 12 and guide members 26 and 30 places first elongate member 34 in tension. This tension exerts an upward force 56 (FIG. 2) against first rotatable member 52, which helps support the weight of first guide member 26 and about half the hanging weight of curtain 12. The tension in first elongate member 34 also exerts a downward force 58 (generally equal in magnitude to force 56) against second rotatable member 54. Consequently, second elongate member 36 not only supports the weight of second guide member 30 and about half the hanging weight of curtain 12, but also counteracts the downward vertical component of force 58. As a result, the tension in second elongate member 36 is appreciably greater than the tension in first elongate member 34. The term, "appreciably greater" means at least 20 percent greater. In some embodiments, second elongate member 36 has about twice as much tension as first elongate member 34, even though the hanging weight of curtain 12 is shared about equally between elongate members 34 and 36.

Figure 4:
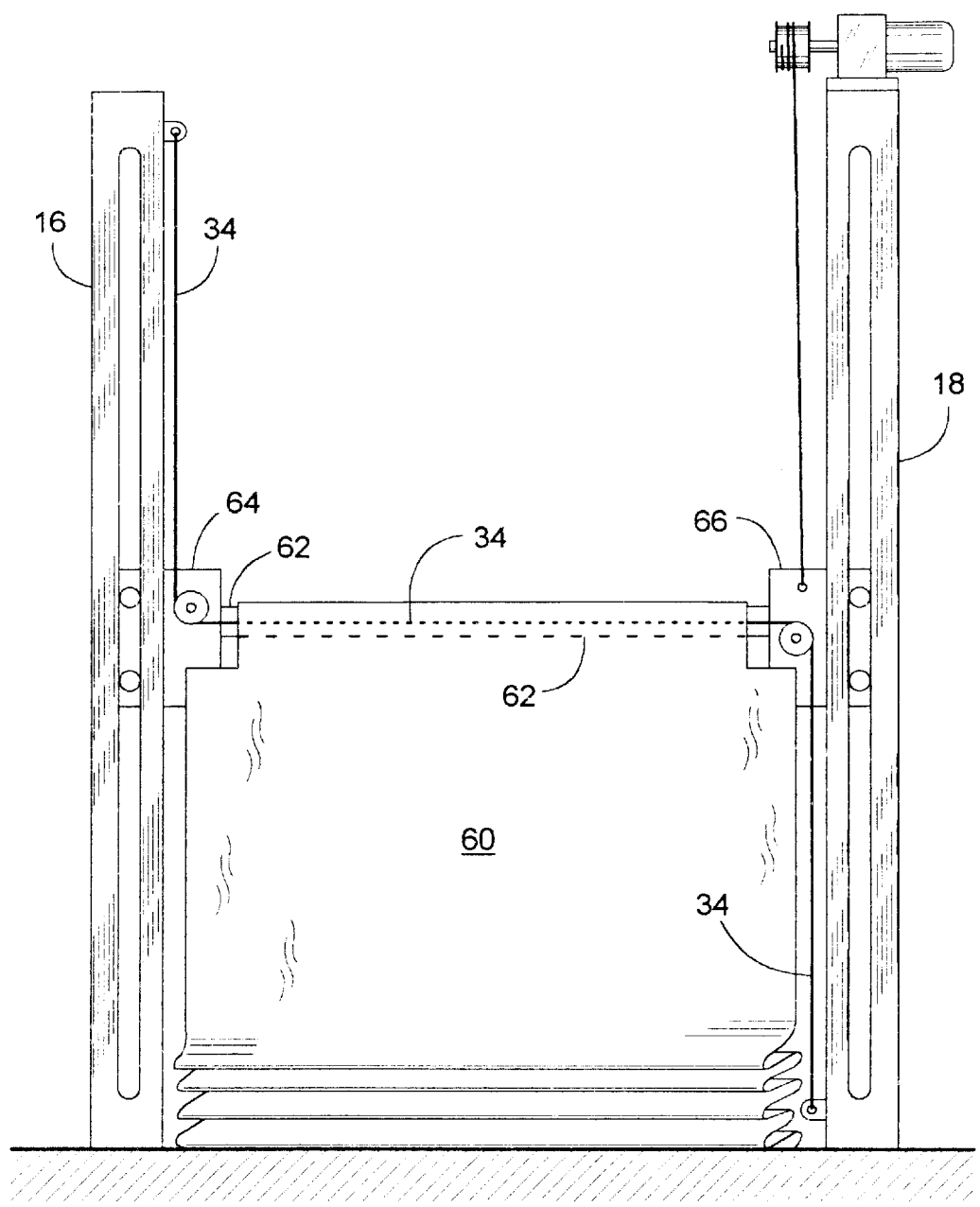
FIG. 4 is similar to FIG. 2, but of another embodiment of a barrier.

The horizontal components of forces 56 and 58 are transmitted through guide members 26 and 30 and rollers 32, which in turn applies a horizontal force against tracks 16 and 18. The horizontal forces applied by rollers 32 against tracks 16 and 18 urge the tracks toward each other and subjects rollers 32 to a force that may shorten their life. To minimize this effect, a curtain 60 may be provided with a generally rigid curtain header 62, as shown in FIG. 4. Curtain header 62 can be a channel, tube, or other structural member that can withstand horizontal compression created by the tension in first elongate member 34 (i.e., compression created by the horizontal components of forces 56 and 58). In this way, curtain header 62 can hold two curtain guide members 64 and 66 a certain distance apart from each other without having to rely on the strength and stiffness of tracks 16 and 18. Curtain header 62 also provides a convenient structure to which curtain 60 may be attached. If curtain header 62 is in the form of a channel or a tube, the interior of curtain header 62 may provide a covered passageway through which elongate member 34 may run.

Figure 5:
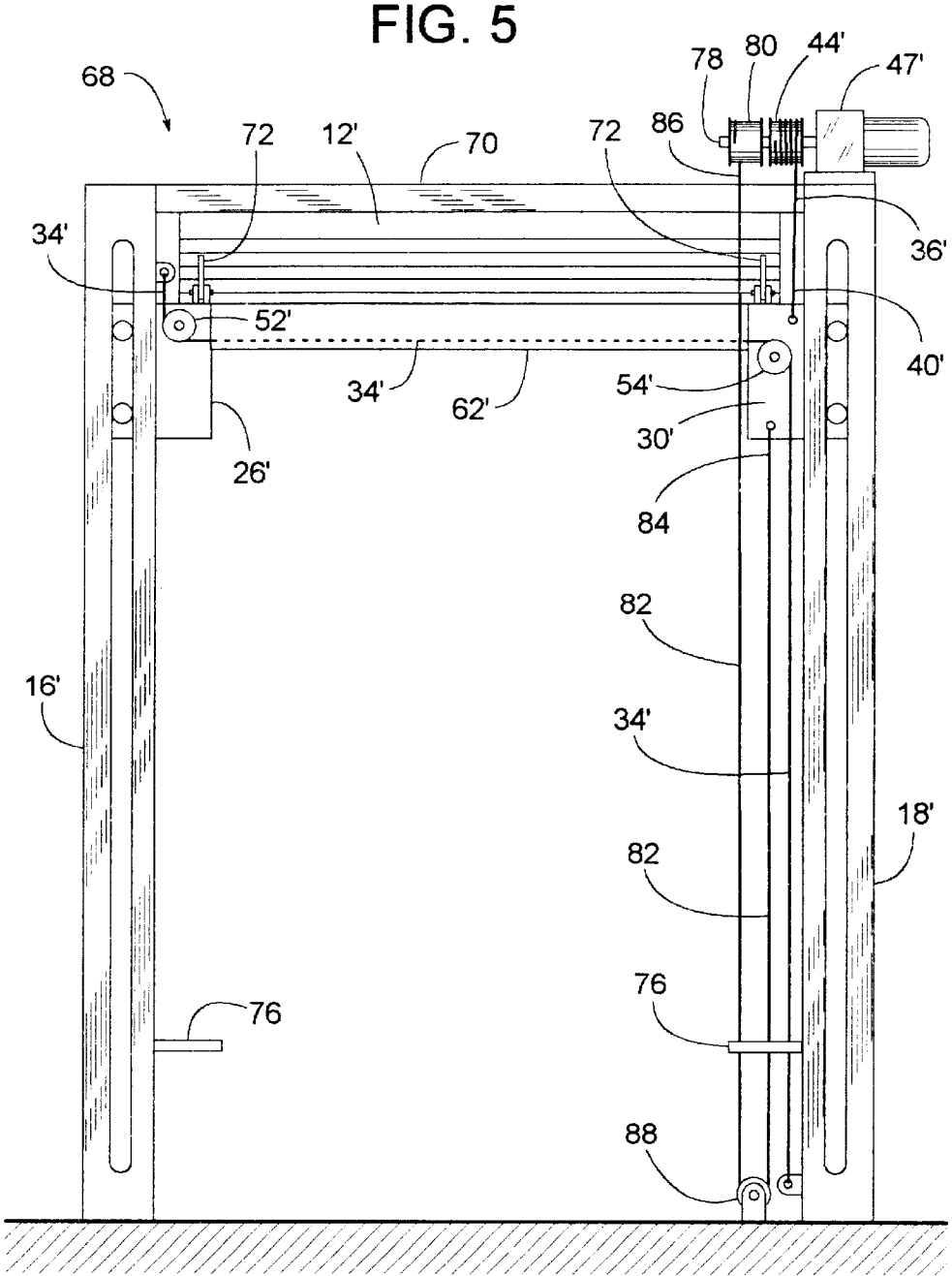
FIG. 5 is a schematic illustration of yet another embodiment of a barrier with its curtain raised to an open position.
Figure 6:
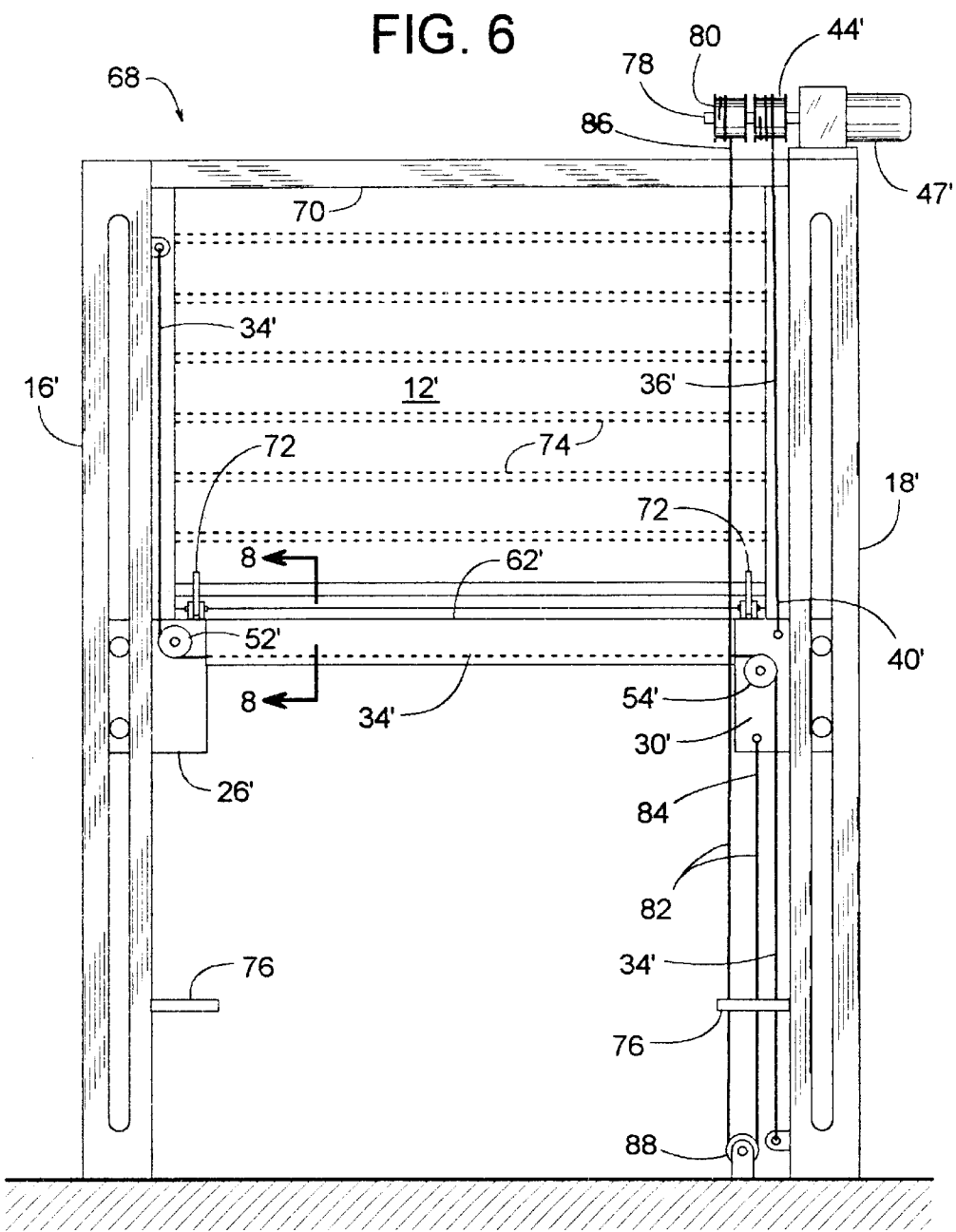
FIG. 6 is a schematic illustration of the barrier of FIG. 5, but shown with its curtain at an intermediate position.

In some applications (e.g., when the access opening is a doorway), it may be desirable to have a barrier 68 whose curtain 12' stores in a raised position to keep the floor clear, as shown in FIG. 5. Barrier 68 is also shown in an intermediate position in FIG. 6 and in a closed position in FIG. 7. Many of the parts of barrier 68 are similar in structure and function to corresponding parts of barrier 10 and/or 68. In particular, a first pliable elongate member 34' (e.g., a fabric strap), a second pliable elongate member 36', a powered drum 44', a first track 16', a second track 18', a first curtain guide member 26', a second curtain guide member 30', a first rotatable member 52', a second rotatable member 54', and curtain header 62' are similar to first pliable elongate member 34, second pliable elongate member 36, powered drum 44, first track 16, second track 18, first curtain guide member 26, second curtain member 30, first rotatable member 52, second rotatable member 54, and curtain header 62, respectively.

Figure 8:
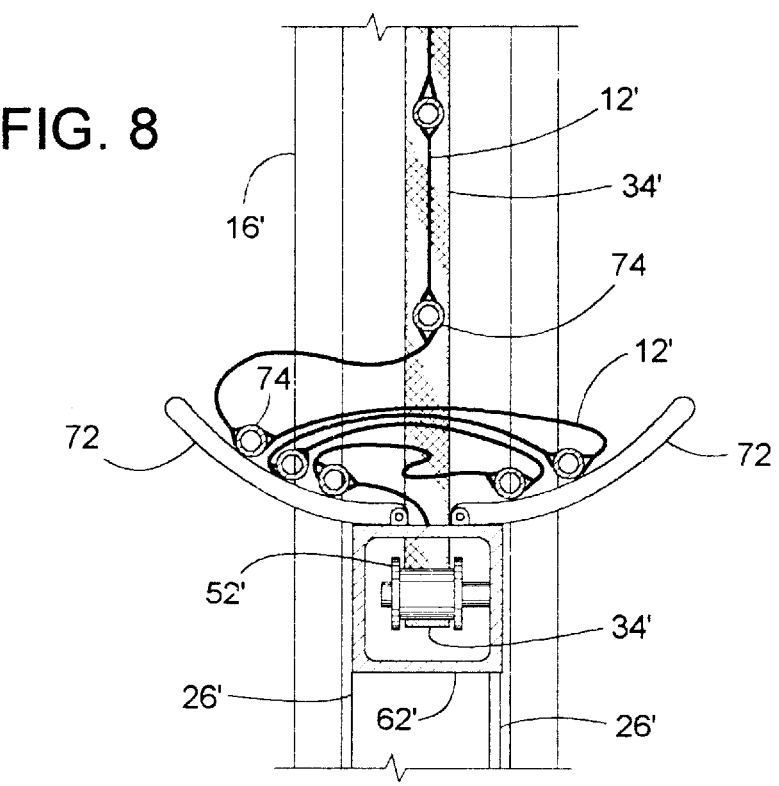
FIG. 8 is a cross-sectional view taken along line 8—8 of FIG. 6.

An upper edge of curtain 12' attaches to an overhead cross member 70 that extends between tracks 16' and 18'. A lower edge of curtain 12' connects to curtain header 62'. As barrier 68 opens, a lower portion of curtain 12' folds upon itself and collects in one or more curtain holders 72 that are pivotally attached to curtain header 62', as shown in FIG. 8. This curtain gathering process can be facilitated by providing curtain 12' with the added weight and stiffness provided by several curtain stiffeners or bars 74, which can assume a variety of structures including, but not limited to, rectangular bar stock, round bar stock, or pipes.

Figure 7:
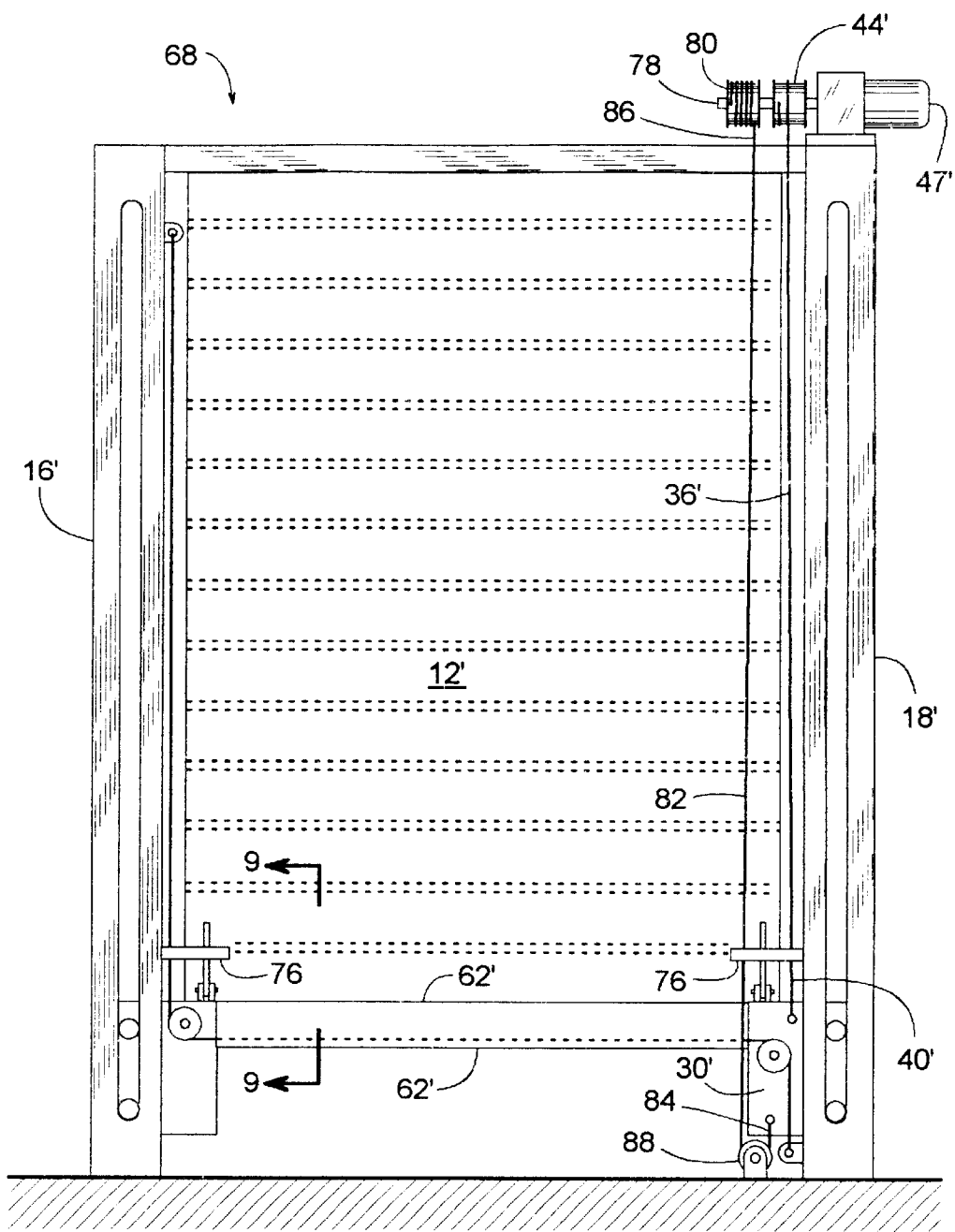
FIG. 7 is a schematic illustration of the barrier of FIG. 5, but shown with its curtain raised to a closed position.
Figure 9:
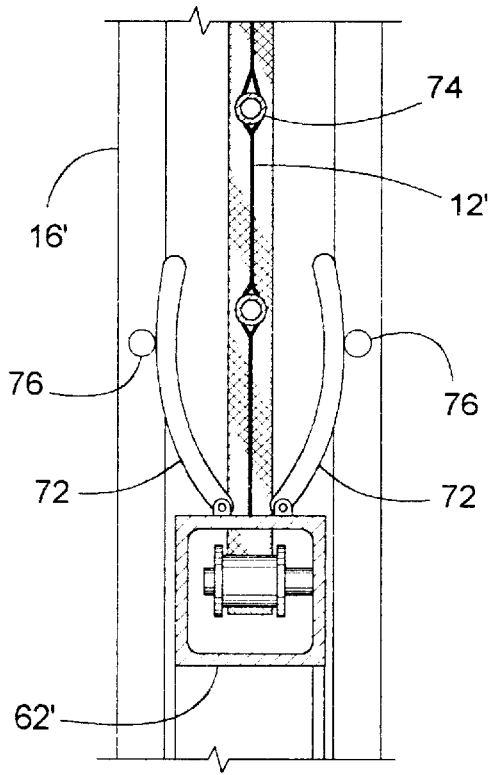
FIG. 9 is a cross-sectional view taken along line 9—9 of FIG. 6.

To improve the appearance of barrier 68 when in the closed position of FIG. 7, pins 76, protruding from tracks 16' and 18', force curtain holder 72 to pivot upward as the holders are lowered between adjacent pins 76, as shown in FIGS. 7 and 9. As curtain 12' rises from its stored position of FIGS. 7 and 9 to an intermediate position of FIGS. 6 and 8, curtain holders 76 are lifted away from pins 76. This allows holders 72 to pivot outward to a position where the holders can effectively collect the lower folded portion of curtain 12', as shown in FIG. 8.

To help inhibit someone from manually forcing barrier 68 open when a drive unit 47' is turned off, drive unit 47' includes a single drive shaft 78 for driving the rotation of both the first powered drum 44' and a second powered drum 80. The structure and function of first drum 44' is similar to that of first drum 44 of barrier 10. With second drum 80, a third pliable elongate member 82 includes a lower section 84 fixed relative to second curtain guide member 30' and an upper section 86 fixed to and wrapped around second drum 80. An intermediate section of third elongate member 82 passes underneath a rotatable member 88 that is at a generally fixed location near the bottom of barrier 68. Elongate members 82 and 36' wrap around their respective drums 80 and 44' in opposite directions. So, as shaft 78 rotates, lower section 84 of elongate member 82 and a lower end 40' of elongate member 36' move in the same direction with second curtain guide member 30'. Consequently, when shaft 78 is not rotating, lower section 84 of elongate member 82 and lower end 40' of elongate member 36' help hold second guide member 30' generally fixed, thus helping to inhibit someone from forcing barrier 68 open when drive unit 47' is turned off. In cases where elongate members 36' or 82 are a strap that overlaps itself upon wrapping about a drum, such elongate members may be provided with a spring or some other yielding member that compensates for a drum's effective change in diameter caused by varying the number of strap layers around the drum as the drum rotates.

Figure 10:
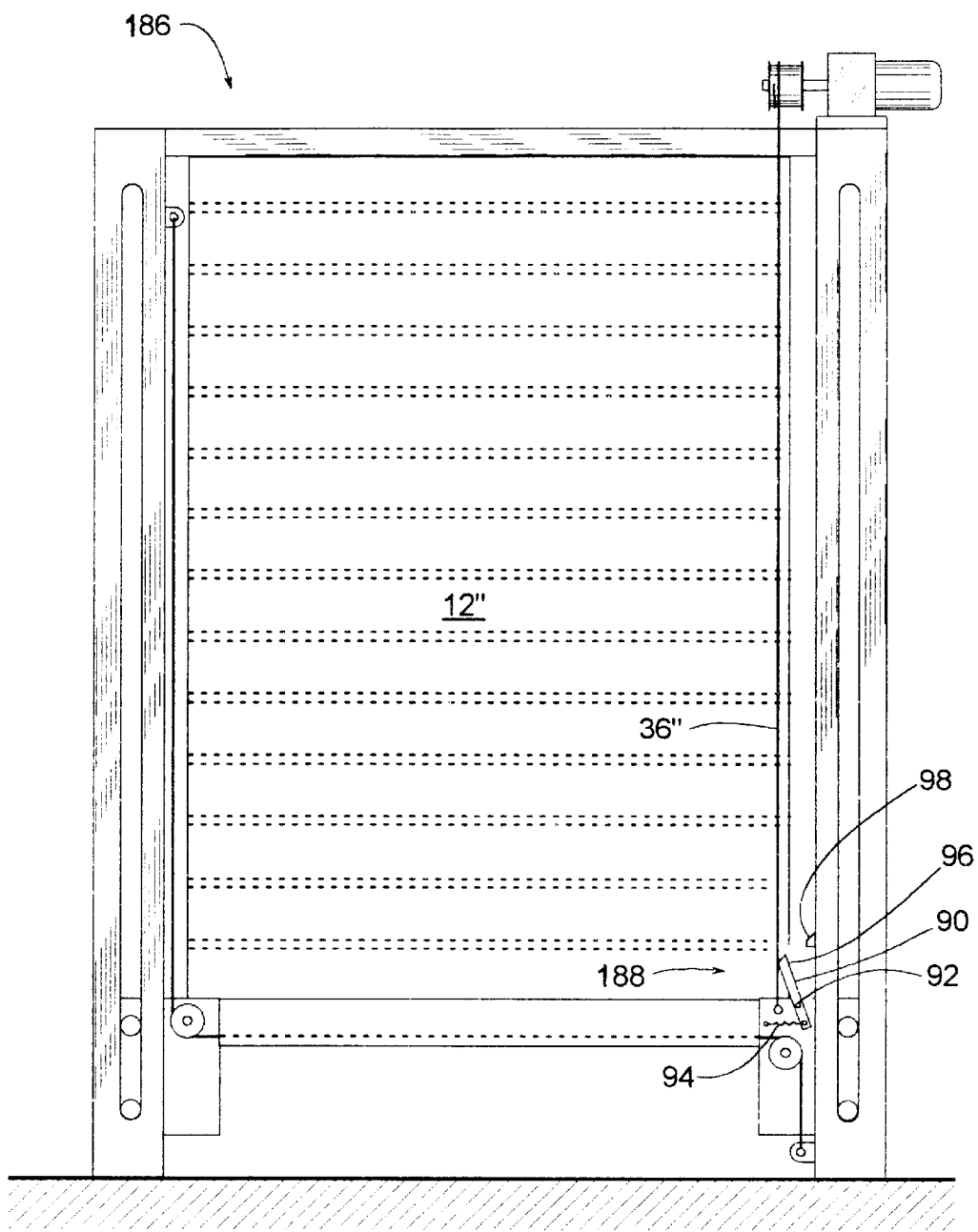
FIG. 10 is a schematic illustration of a barrier including a curtain shown in its closed position and a curtain-blocking device shown in a release position.

As an alternative to having a second powered drum for inhibiting someone from forcing a barrier open, a barrier 186 can be provided with a curtain-blocking device 188, as shown in FIGS. 10 and 11. Device 188 includes a pawl 90 pivotal about a pin 92. A tension spring 94 urges pawl 90 to pivot clockwise (as viewed in the drawing figures). An upper end 96 of pawl 90 is connected to a pliable elongate member 36". When the weight of a curtain 12" holds elongate member 36" taut, the tension in elongate member 36" holds pawl 90 in a release position, as shown in FIG. 10. If someone begins manually lifting curtain 18", elongate member 36" relaxes, which allows spring 94 to pivot pawl 90 to a blocking position, as shown in FIG. 11. In the blocking position, upper end 96 of pawl 90 engages a fixed stop 98 that inhibits further manual lifting of curtain 12".

Although the invention is described with reference to a preferred embodiment, it should be appreciated by those skilled in the art that various modifications are well within the scope of the invention. For instance, although curtain 12' of barrier 68 in FIG. 7 is not shown completely down against the floor in the closed position, modifying barrier 68 to provide a tightly closed position would involve modifications that would be obvious to those skilled in the art. For example, a rigid panel could simply be attached to the underside of curtain header 62' to fill any gaps between header 62' and the floor. To show more clearly the operation of various barriers, several barrier components are shown positioned where they are visible rather than hidden within a track. For example, pliable elongate members, trolley rollers, rotatable members, curtain guide members, curtain holders, and curtain-blocking devices have been shown extending into the access opening or doorway. It should clear to those skilled in the art, that such components can be readily contained within the tracks. Moreover, the disclosed barriers can be provided with various compliant seals to seal air gap, such as between the curtain and the adjacent tracks. Therefore, the scope of the invention is to be determined by reference to the claims that follow.

I claim:

1. A barrier, comprising:
   a curtain movable in an upward direction between an open position and a closed position;
   a first rotatable member and a second rotatable member both of which are coupled to the curtain to move upward therewith; and
   a first pliable elongate member engaging the first rotatable member and the second rotatable member, wherein the first pliable elongate member exerts an upward force against the first rotatable member and exerts a downward force against the second rotatable member.

2. The barrier of claim 1, wherein the upward force and the downward force are substantially equal in magnitude.

3. The barrier of claim 1, further comprising:
   a first track;
   a second track;
   a first curtain guide member coupled to the curtain and movable along the first track, wherein the first rotatable member is coupled to the first curtain guide member; and
   a second curtain guide member coupled to the curtain and movable along the second track, wherein the second rotatable member is coupled to the second curtain guide member.

4. The barrier of claim 3, wherein the curtain includes a curtain header rigidly extending between the first curtain guide member and the second curtain guide member.

5. The barrier of claim 4, wherein the first pliable elongate member extends along the curtain header.

6. The barrier of claim 3, wherein the first curtain guide member and the second curtain guide member include a wheeled trolley.

7. The barrier of claim 1, further comprising a second pliable elongate member coupled to the curtain and exerting a lifting force that opposes the downward force.

8. The barrier of claim 7, further comprising a powered drum about which the second pliable elongate member is wrapped.

9. The barrier of claim 7, wherein the second pliable elongate member is a strap.

10. The barrier of claim 1, wherein the first pliable elongate member is a strap.

11. The barrier of claim 1, wherein the curtain extends higher in the closed position than in the open position.

12. The barrier of claim 1, wherein the curtain extends lower in the closed position than in the open position.

13. A barrier, comprising:
    a first pliable elongate member in tension;
    a second pliable elongate member in tension; and
    a curtain movable between an open position and a closed position and being suspended from the first pliable elongate member and the second pliable elongate member, wherein the tension in the second pliable elongate member is appreciably greater than the tension in the first pliable elongate member.

14. The barrier of claim 13, wherein the first pliable elongate member and the second elongate member carry substantially equal portions of the curtain's weight.

15. The barrier of claim 13, wherein the curtain includes a leading edge, wherein the first pliable elongate member extends above and below the leading edge.

16. The barrier of claim 13, further comprising:
    a first track and a second track defining an access opening therebetween;
    a first curtain guide member coupled to the curtain and movable along the first track;
    a second curtain guide member coupled to the curtain and movable along the second track;
    a first rotatable member coupled to the first curtain guide member; and
    a second rotatable member coupled to the second curtain guide member, wherein the first pliable elongate member extends across the first rotatable member and across the second rotatable member.

17. The barrier of claim 13, further comprising a powered drum about which the second pliable elongate member is wrapped.

18. The barrier of claim 13, wherein the curtain extends higher in the closed position than in the open position.

19. The barrier of claim 13, wherein the curtain extends lower in the closed position than in the open position.

20. A barrier, comprising:
    a first track and a second track defining an access opening therebetween;
    a curtain coupled to the first track and the second track and having a leading edge extending across the access opening with a first end of the leading edge being adjacent the first track and a second end of the leading edge being adjacent the second track, the curtain being movable between a closed position and an open position, wherein the curtain covers more of the access opening when in the closed position than when in the open position;

a drive assembly adjacent the second track and coupled to the second end of the leading edge to help move the curtain between the open position and the closed position; and a first pliable elongate member having an upper portion, a lower portion, and an intermediate portion therebetween, wherein the upper portion is above the leading edge and is fixed adjacent the first track, the lower portion is below the leading edge, and the intermediate portion is adjacent the first end and the second end of the leading edge, wherein the first pliable elongate member helps support the weight of the curtain.

21. The barrier of claim 20, wherein the drive assembly includes a second pliable elongate member having a lower end coupled to the second end of the leading edge and having an upper end wrapped about a powered drum.

22. The barrier of claim 20, wherein the curtain extends higher in the closed position than in the open position.

23. The barrier of claim 21, further comprising a third pliable elongate member having a lower section coupled to the second end of the leading edge and having an upper section wrapped about a second powered drum that rotates with the first powered drum, wherein the second pliable member and the third pliable elongate member are wrapped in opposite directions around the first powered drum and the second powered drum respectively.

24. The barrier of claim 20, further comprising:

a first curtain guide member movable along the first track and being coupled to the first end of the leading edge of the curtain;

a second curtain guide member movable along the second track and being coupled to the second end of the leading edge of the curtain;

a first rotatable member coupled to the first curtain guide member; and a second rotatable member coupled to the second curtain guide member, wherein the first pliable elongate member extends across the first rotatable member and across the second rotatable member.

25. The barrier of claim 24, wherein the first curtain guide member and the second curtain guide member include a wheeled trolley.

26. The barrier of claim 24, wherein the curtain includes a curtain header rigidly extending between the first curtain guide member and the second curtain guide member.

27. The barrier of claim 26, wherein the first pliable elongate member extends along the curtain header.

28. The barrier of claim 21, further comprising a curtain-blocking device coupled to the curtain and being movable between a blocking position and a release position in response to a change in tension in the second pliable elongate member, such that in the blocking position the curtain-blocking device helps inhibit the curtain from moving to the open position, and in the release position the curtain-blocking device allows the curtain to move to the open position.

29. The barrier of claim 20, wherein the curtain extends lower in the closed position than in the open position.

30. The barrier of claim 29, further comprising a curtain holder disposed along the leading edge of the curtain, wherein the curtain holder collects a folded portion of the curtain as the curtain moves upward to the open position.

31. The barrier of claim 30, wherein the curtain holder is pivotally coupled to the leading edge of the curtain.

32. A barrier, comprising:

a curtain header being vertically movable;

a curtain coupled to the curtain header and being vertically movable therewith; and a pliable elongate member having a first end fixed above the curtain header, and a second end fixed below the curtain header, the pliable elongate member being held in tension and being coupled to the curtain header, wherein the tension of the pliable elongate member creates horizontal compression in the curtain header.

33. The barrier of claim 32, wherein the pliable elongate member exerts an upward force and a downward force that are transmitted to the curtain header.

* * * * *